United States Patent [19]

Hajduk

[11] 3,766,552

[45] Oct. 16, 1973

[54] UNIFIED AREA SURVEILLANCE, COMMUNICATION AND MOBILE STATION GUIDANCE SYSTEM

[76] Inventor: Marian S. Hajduk, 145-77 9th Ave., Whitestone, N.Y. 11357

[22] Filed: Dec. 14, 1970

[21] Appl. No.: 97,663

[52] U.S. Cl. ........ 343/6 R, 343/6.5 R, 343/100 CS, 343/112 CA, 343/112 TC

[51] Int. Cl. .................................................. G01s 9/02

[58] Field of Search ........... 343/6 R, 6.5 R, 100 CS, 343/112 CA, 112 TC

[56] References Cited

UNITED STATES PATENTS

| | | | |
|---|---|---|---|
| 3,665,464 | 5/1972 | Meilander | 343/6.5 R |
| 3,659,085 | 4/1972 | Potter et al. | 343/112 TC X |
| 3,263,231 | 7/1966 | Smith et al. | 343/100 CS X |
| 3,419,865 | 12/1968 | Chisholm | 343/112 TC |
| 3,646,580 | 12/1972 | Fuller et al. | 343/112 TC |

*Primary Examiner*—T. H. Tubbesing
*Attorney*—Peter L. Tailer

[57] ABSTRACT

A unified area surveillance, communication and mobile station guidance system comprising a traffic control (TC) center having a plurality of reference stations associated therewith, the mobile station including means for transmitting calling pulses having a predetermined repetition period which pulses arrive and are received by said reference stations which information is then fed to said TC center to compute the position of and track said mobile station with respect thereto and to continuously track said calling pulses, said TC center thereafter causing the generation of an interrogation signal to said mobile station via transmissions generated from three of said reference stations at such times that said transmissions arrive only in the vicinity of said selected mobile station in an established interrogating pattern having an established time relationship with the aboard generated calling pulses to provide reliable mobile station selectivity, the reception of said interrogation signal enabling direct communication between said TC center and the aboard mobile station equipment to provide time-multiplexed voice communication and collision avoidance and mobile station guidance data which may be used for automatic operation of said mobile station, communication between the mobile station and the TC center is in digital form and in particular in binary coded decimal form to thereby provide said selected mobile station with collision avoidance, enroute navigation and approach data which data may be directly displayed on a digital display aboard said mobile station without any conversion of the data.

50 Claims, 14 Drawing Figures

INVENTOR.
MARIAN S. HAJDUK
BY Philip D. Amins
ATTORNEY

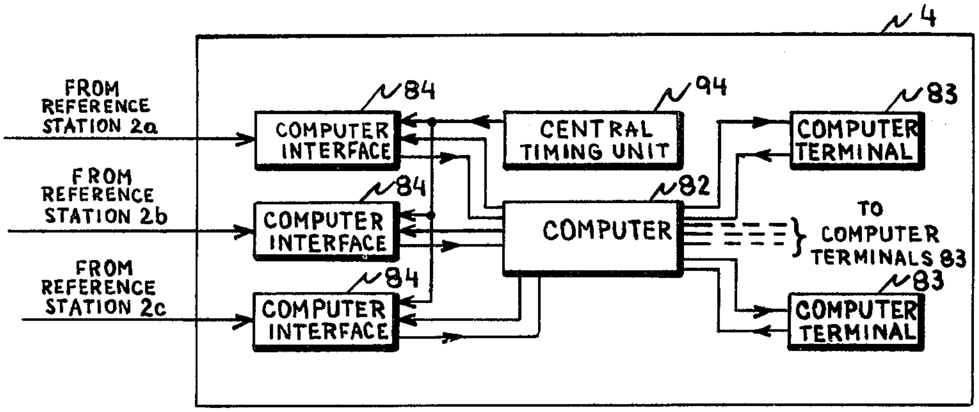
FIG.3
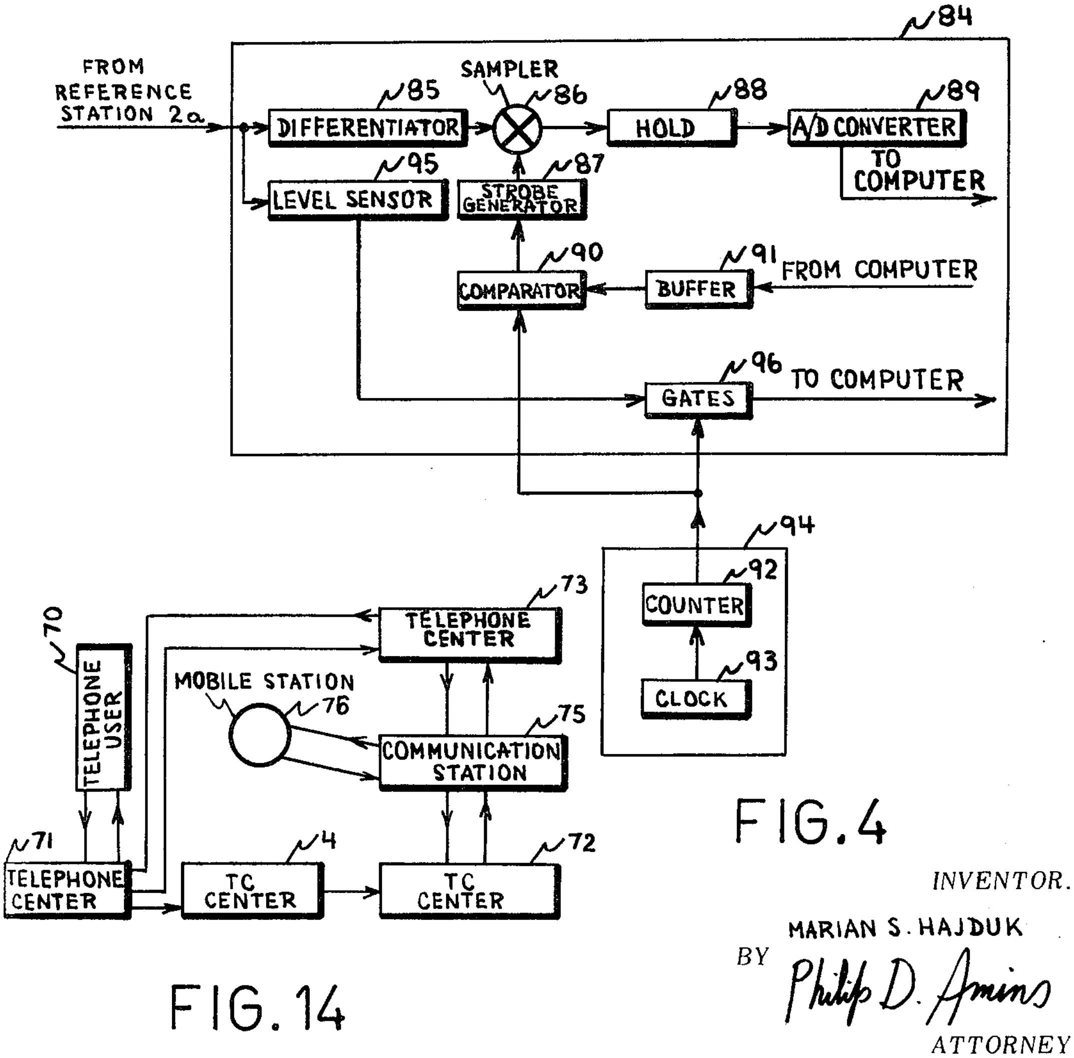
FIG.4
FIG.14
INVENTOR.
MARIAN S. HAJDUK
BY Philip D. Amins
ATTORNEY INVENTOR.
MARIAN S. HAJDUK
BY Philip D. Amins
ATTORNEY INVENTOR.
MARIAN S. HAJDUK
BY Philip D. Amins
ATTORNEY INVENTOR.
MARIAN S. HAJDUK
BY Philip D. Amino
ATTORNEY INVENTOR.
MARIAN S. HAJDUK
BY Philip D. Amins
ATTORNEY

UNIFIED AREA SURVEILLANCE, COMMUNICATION AND MOBILE STATION GUIDANCE SYSTEM

This invention relates to area surveillance, and particularly to safe and optimal traffic flow, which is based on a new method of communication with mobile stations.

The present-day Air Traffic Control (ATC) system is a remainder of the technology of the 1940's and 1950's, when the cost of electronic equipment was so high that it could hardly be afforded by general aviation. Also, the information processing means were in their early stages of development, which prohibited any sophisticated system development. The most acceptable solution to the ATC problem at that time was an independent radar, which relieved aircraft from having any type of cooperative ATC equipment. The misdetection and lack of aircraft identification were the main problems with this type of system from its first inception. The transponder, partially solved the problem of identification but revealed yet other disadvantages of the ATC system. These disadvantages were the information processing, display and communication with selected aircraft. The present day ATC system is an evolutionary development. It incorporates in its structure present day technology with the ATC concept of the forties and fifties. This concept does not include means for collision avoidance between aircraft, and as a result, despite all the ATC sophistication in the immediate airport vicinity, the majority of midair collisions and near misses occur in the proximity of the airport. In the 1960's there was an extensive search for a midair collision avoidance system. There are, however, many more aircraft-to-ground collisions than midair collisions of aircraft. However, this situation has not attracted any more attention than it had in the past and has not resulted in any common acceptable system.

SUMMARY OF THE INVENTION

It is, therefore, the primary object of the present invention to provide a new and unique area surveillance system which will prevent midair collisions as well as aircraft-to-ground collisions.

Another object of the present invention is to provide an optimum air traffic flow.

A further object of the present invention is to provide automatic guidance of aircraft during all phases of flight.

It is yet another object of the present invention to permit an aircraft's communication systems to directly communicate with the ground communication network inclusive of telephone communications.

Moreover, since the losses due to marine collisions exceed those of air traffic collisions while there is no system in existence which would appreciably lower the rate of collisions in places of their highest occurrence, it is yet a further object of the present invention to provide monitoring and guidance of ships in coastal waters, harbors, and on major rivers which will also enhance the economy of sea transportation by making the same less dependent upon weather conditions.

It is still another object of the present invention to incorporate all ships into a ground communication network.

It is still a further object of the present invention to provide a system for monitoring and communicating with land mobile stations.

It is yet another object of the present invention to provide a system of the foregoing type which incorporates therein structure for future traffic development and which is accomplished by providing high selectivity and precise location of each mobile station.

It is yet a further object of the present invention to provide a system of the aforementioned type which includes a traffic control center, a plurality of reference stations and a communication station, all having highly sophisticated equipment, whereby airborne, marine and ground equipment carried aboard mobile stations may be made highly reliable and yet relatively inexpensive.

It is still a more particular object of the present invention to provide a new conceptual traffic control system, which incorporates in its structure the optimum of traffic flow, position location, collision avoidance, navigation, automatic guidance, and communication; and wherein the scope of traffic control services to each mobile station is dependent upon the sophistication of the aboard equipment with the difference in cost between the least and most sophisticated equipment being small, whereby in the foreseeable future all mobile stations will be provided with full traffic control information.

BRIEF DESCRIPTION OF THE DRAWINGS

The foregoing and other objects, features and advantages of the present invention will become more apparent from the detailed description hereinafter considered in conjunction with the accompanying drawings, wherein:

FIG. 3 is a block diagram of the traffic control center shown in FIG. 2;

FIG. 4 is a block diagram of a computer interface of the type shown in FIG. 3;

FIG. 14 is a block diagram depicting communication links between a flying mobile station and a ground communication network.

DESCRIPTION OF THE PREFERRED EMBODIMENT

Figure 1:
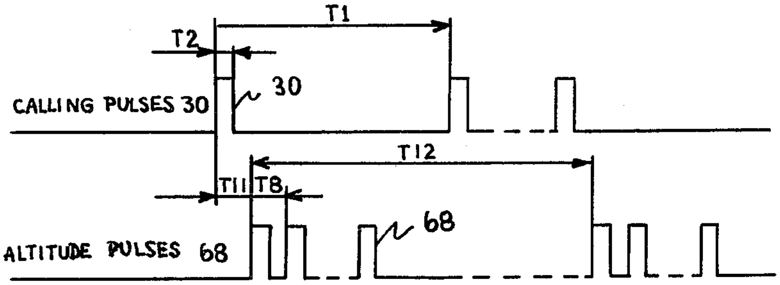
FIG. 1 depicts a timing diagram of calling pulses and altitude information emanating from a flying mobile station in accordance with the principles of the present invention.

Referring now to the drawings and more particularly to FIG. 1 thereof, there is depicted a string of pulses 30 called the calling pulses which pulses are generated by each mobile station. When the mobile station is a flying mobile station, there is also generated altitude information in the form of pulses 68. The calling pulses are rf pulses having a predetermined repetition period T1 and width T2. The period T1 is preferably 40 milliseconds while the width T2 is preferably 1 $\mu$sec.

Figure 2:
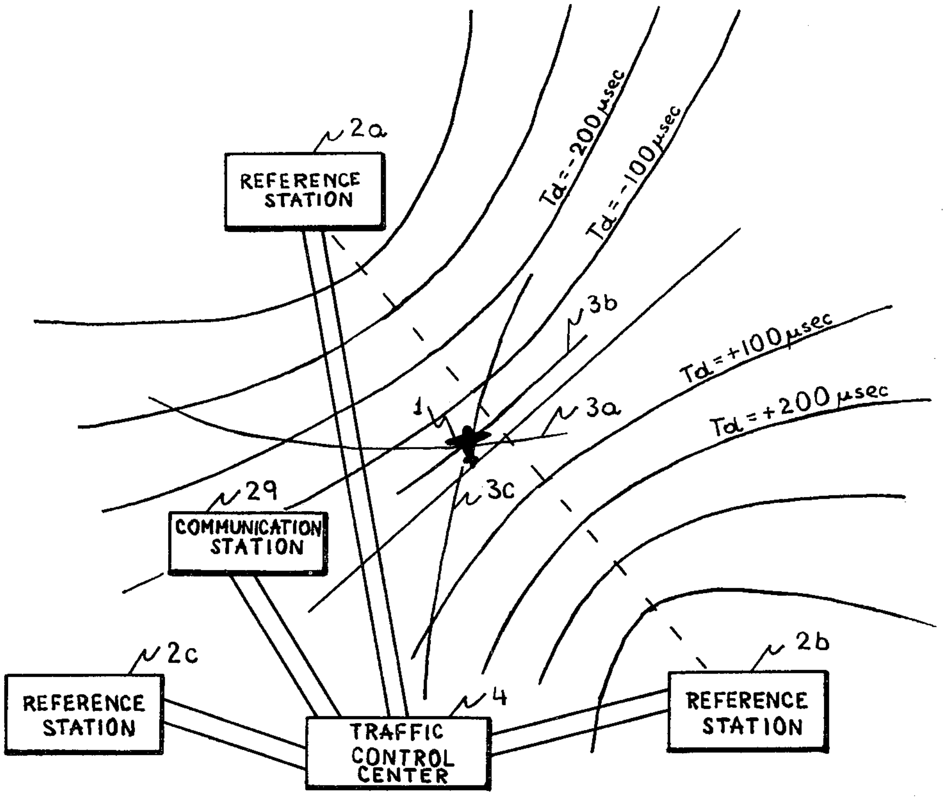
FIG. 2 is a block diagram depicting the various component parts of the area surveillance system of the present invention in conjunction with flying mobile stations.

The basic traffic control (TC) system is shown in FIG. 2 wherein reference stations 2*a*, 2*b*, and 2*c* which are fixed ground or satellite stations receive the calling pulses 30 generated by a flying mobile station 1. The difference in the time of arrival of the pulses 30 at the stations 2*a*, 2*b*, and 2*c* is an indication of the relative position of the mobile station 1 with regard to the stations 2*a*, 2*b*, and 2*c*. The plot of constant time difference of the arrival of the calling pulses 30 to any two of the reference stations 2*a*, 2*b*, or 2*c* is a hyperboloid. The difference in time of arrival of the calling pulses 30, denoted $T_d$, to any combination of two stations of the three reference stations 2*a*, 2*b*, and 2*c* is a specific hyperboloid. By way of illustration, the mobile station 1 (FIG. 2) is on the hyperboloid 3*b* with regard to the pair of stations 2*a* and 2*b* and on the hyperboloid 3*a* with regard to the pair of stations 2*a* and 2*c*.

The arrival time of the calling pulses 30 at the reference stations 2*a*, 2*b*, and 2*c* is relayed to the TC center 4 which then computes the position of the mobile station 1 by solving an equation involving two of the hyperboloids; either 3*a* and 3*b*, 3*a* and 3*c* or 3*b* and 3*c*, together with the altitude information conveyed by the pulses 68 for flying mobile stations. The uninvolved hyperboloid is used as a check which is a particularly important operation in the acquisition of a new mobile station in the given area. The system may also include four or more reference stations. When four reference stations are utilized, there results six families of hyperboloids which are useful when the TC center 4 acquires a multiplicity of mobile stations in short periods of time, or when the TC center 4 computes the altitude of the aircraft by solving an equation involving hyperboloids.

Referring now to FIG. 3, the TC center 4 comprises a computer 82, a multiplicity of computer terminals 83, a multiplicity of computer interfaces 84 and a central timing unit 94. The computer 82 may be any general purpose digital computer, one example of which is a Model 2116B computer manufactured by Hewlett-Packard. The selection of the computer model is mainly dependent upon the expected maximum traffic volume.

The computer terminals 83 are preferably of the CONSUL 880 type, manufactured by ADDS. This terminal has a built-in CRT display which can indicate to the traffic controller all mobile stations on a selected route, at a selected altitude, or in a selected area; such as, the airport vicinity. The display may be in terms of position of the identified mobile stations or in terms of their separations. The display may also monitor a selected mobile station or a group of selected mobile stations. The selection of the display type is accomplished by keyed entries at the terminals 83. In order to increase the efficiency of the computer 82, there is provided a computer interface 84.

The computer interface 84 is shown in FIG. 4 and the prime function thereof is to aid the computer 82 in time tracking of the calling pulses 30 which are received by the reference stations 2*a*, 2*b* and 2*c*. The interface 84 includes a differentiator 85 that provides a derivative of the calling pulses 30 which derivative is strobed in a sampler 86 by means of the strobe output of a strobe generator 87. When there is no tracking error, the strobe falls at the zero-crossing of the derivative of the calling pulses 30. If the tracking loop has an error, the strobe will fall on the positive or negative slope of the derivative, in dependence upon whether the tracking loop produces the strobe too early or too late, respectively. Sampling of the derivative slope produces a voltage which is proportional to the deviation from the zero-crossing of the derivative. This voltage is stored within a hold 88 and converted into binary form by means of an analog-to-digital (A/D) converter 89. The output of the A/D converter 89 is fed to computer 82 which then provides correction to the tracking loop of the given calling pulses 30. The instant of the strobing of the derivative of the calling pulses 30 is determined by the coincidence signal output from a comparator 90. The coincidence signal is produced whenever the contents of a buffer 91 is equal to the contents of a counter 92. The buffer 91 is loaded or fed from the memory of the computer 82 and the content thereof indicates the expected arrival time of the calling pulses 30. The counter 92 is under control of a reference clock 93 and has overflows separated by T1 (T1 being the time separation between calling pulses 30). Thus, the time of arrival of the calling pulses 30 can be compared with the content of the counter 92 which serves as a time reference. In order to prevent the tracking of calling pulses 30 generated in remote areas, which are under the control of other TC centers, and to enable acquisition of a new series of calling pulses 30, a level sensor 95 enables gates 96 whenever the received calling pulses 30 exceed a predetermined magnitude. The content of the counter 92 which is transferred to the computer 82 via the gates 96 is used to acquire the time position of new calling pulses 30 and to continue tracking of previously acquired signals. However, when the contents of counter 92 is not loaded into computer 82 during several time periods T1, then at the time of occurrence of the coincidence signal from comparator 90, the tracking of the newly received calling pulses 30 will be discontinued. In a similar manner there will be a discontinuance of the tracking of previously acquired calling pulses 30 when the magnitude thereof decreases below said predetermined magnitude.

Thus, the computer 82 performs five functions: acquisition of new mobile stations, tracking of previously acquired mobile stations, area surveillance, guidance and collision prevention for mobile stations and communication with previously acquired mobile stations.

The acquisition of a new mobile station is performed only on unidentified strings of calling pulses 30. The calling pulses 30 which were previously associated with a given mobile station do not participate in the acquisition of a new mobile station. As discussed hereinbefore, each mobile station transmits its altitude by means of the pulses 68. It is, therefore, possible to categorize all tracked calling pulses 30 according to their altitude. This is particularly helpful during acquisition and interrogation of an aircraft. The basic acquisition algorithm is as follows:

1. The unidentified calling pulses 30 from reference station 2*a* are compared with unidentified calling pulses 30 from stations 2*b* and 2*c*. The comparison is based on the equation $T_d$ max $\leq$ 6.18 μsec . D, where $T_d$ max is the maximum time differential, and D is the distance in nautical miles (NM) between reference stations.

Thus, the maximum permissable time differential cannot exceed the time differential existent between any two reference stations. If the computed differential $T_d$ is larger than $T_d$ max, then the strings of calling pulses 30 used in the computation of the time differential $T_d$ were not produced by the same mobile station and checking of a new pair of calling pulses 30 follows.

2. If the condition $T_d \leq T_d$ max is satisfied, then the identification procedure for the calling pulses 30 follows. $T_{d1}$, $T_{d2}$ and $T_{d3}$ designate the time differentials between the arrival of the calling pulses 30 at the stations 2*a* and 2*b*, 2*b* and 2*c*, and 2*a* and 2*c*, respectively. The procedure for identification of the calling pulses is based upon the principle that the mobile station position as calculated from either pair $T_{d1}$ and $T_{d2}$, $T_{d2}$ and $T_{d3}$ or $T_{d1}$ and $T_{d3}$ is always the same. However, if the position of a mobile station, as calculated from two different pairs $T_{d1}$–$T_{d2}$ and $T_{d2}$–$T_{d3}$, do not agree, then the calling pulses 30 used in computation of $T_{d1}$, $T_{d2}$ and $T_{d3}$ are not produced by the same mobile station and new calling pulses 30 must be used in computation of the $T_{d1}$, $T_{d2}$ and $T_{d3}$. If neither combination of the unidentified calling pulses 30 results in identification of the mobile station location, it means that the calling pulses 30 are generated in an area which is out of the range of coverage of the TC center 4.

3. Whenever the pairs $T_{d1}$–$T_{d2}$ and $T_{d2}$–$T_{d3}$ result in an agreeable position of the mobile station, this position of the mobile station is interrogated. The identification from the mobile station is assigned to the time tracked calling pulses 30, so that they can be uniquely identified for further processing of the acquired mobile station position.

The calculation of the mobile station position from two pairs of time differentials $T_{d1}$–$T_{d2}$ and $T_{d2}$–$T_{d3}$ is based on the inverted LORAN principle. Therefore, the program for the general purpose computer can be similar to the one employed in the hyperbolic to latitude-longitude coordinate converter within the navigation computer Model 6,340C (manufactured by Lear-Siegler, Inc.). Since the computer very often faces the ambiguity resolution problem, the program preferably is of the noniterative form described in a paper "Explicit (noniterative Loran Solution" by Sheldon Razin (Journal of the Institute of Navigation, Vol. 14, No. 3, 1967, pp. 265–269). The aforementioned programs did not take into account the effect of an aircraft's altitude on the accuracy of the conversion.

Figure 5:
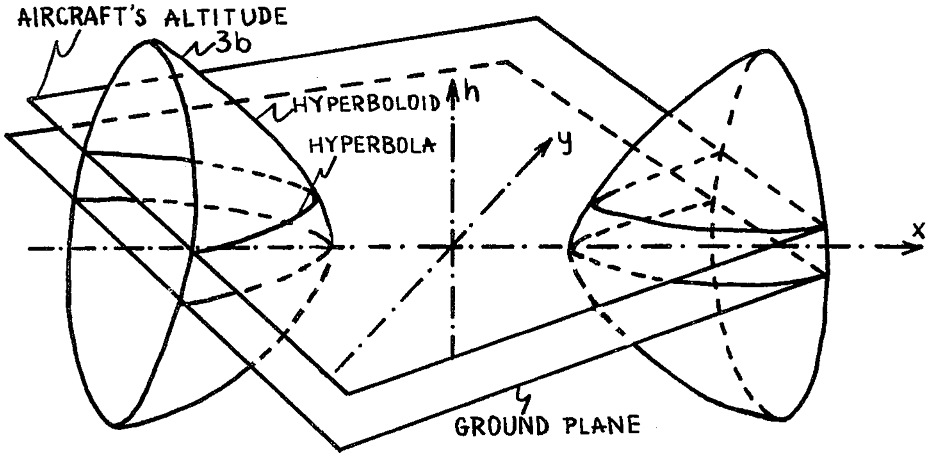
FIG. 5 depicts a representative hyperboloid intersected by the altitude plane of a flying mobile station.

The *rf* frequency of the calling pulses 30, denoted $f_1$, is preferably in the region of 100 MHz. Therefore, to provide a reliable monitoring of aircraft flying at altitudes as low as 500 ft., the maximum separation between reference stations 2*a*, 2*b*, and 2*c* should not exceed 70 NM due to the limitations on wave propagation imposed by the earth's curvature. Whenever the altitude of an aircraft is comparable with the distance from the foci of the hyperboloid 3*a*, 3*b*, or 3*c* (FIG. 2), then the hyperboloid curvature has appreciable effect on the accuracy of the aforementioned programs. A modification to correct the above effect is to cut the hyperboloid with a plane parallel to the earth at the mobile station's altitude, resulting in a hyperbola which is used in compuring the position of the given mobile station. The hyperboloid shown in FIG. 5 has the following equation:

$$(4y^2/d^2-4T_d^2)+(4h^2/d^2-4T_d^2)-X^2/T_d^2=-1$$

where *d* is the time separation between involved reference stations and $T_d$ is the time differential of the arrival of the calling pulses 30 at the reference stations.

By substituting the altitude of the mobile station for *h* in the above equation, an equation of a hyperbola is derived. Since the mobile station altitude (*h*) can be considered as a parameter of the mobile station associated hyperboloids, the hyperboloids 3*a*, 3*b*, or 3*c* can be expressed as:

$$(4y^2/4T_d^2-d^2-4h^2) - [(d^2-4Td^2)X^2/T_d^2(4T_d^2-d^2-4h^2)] = 1$$

which is the form of a standard hyperbola equation. Since the time differential $T_d$ between the arrival of the calling pulses at the reference stations 2*a*, 2*b*, and 2*c* is measured at the TC center 4, the real time differential $T_d$ is obtained by the equation:

$$T_d=T_m-(T_1-T_2),$$

where $T_m$ is the time differential as measured at the TC center 4 and $T_1$ and $T_2$ are the time separations between the TC center 4 and two of the associated reference stations 2*a* and 2*b*, 2*a* and 2*c* or 2*b* and 2*c*.

The TC center 4 tracks the position of each mobile station by means of digital tracking loops and derives therefrom area surveillance data. The area surveillance data includes collision prevention, traffic volume and density predictions, as well as present traffic congestion. This data is displayed at TC center 4 for any selected route or airport vicinity, to provide controllers with necessary information.

Figure 6:
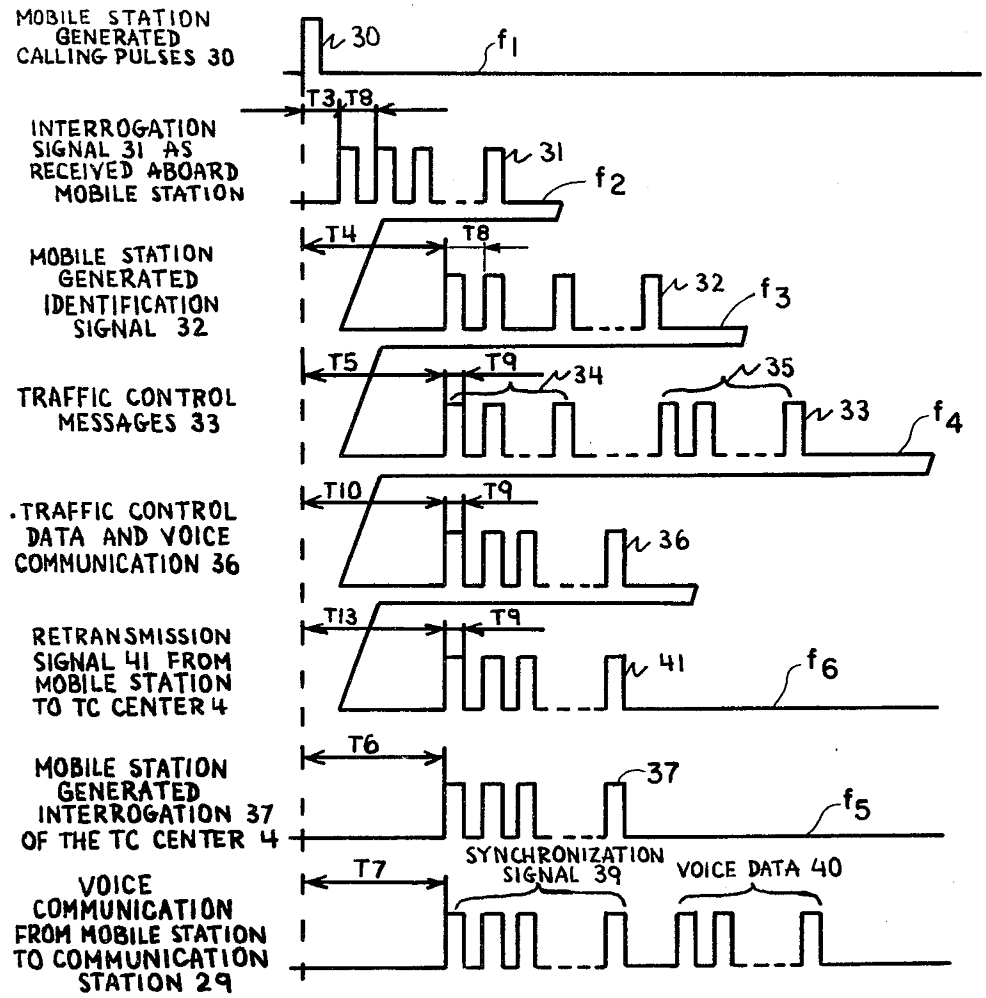
FIG. 6 is a continuous graphic representation depicting the basic format of all information exchanged between the flying mobile station and the traffic control center as a function of time.

The TC center 4 compares the actual track of mobile station 1 with the intended course of the mobile station. The cross-track error, position, distance "to go" and along track error, as well as the maneuvers requested by the TC center 4 are relayed to the mobile station 1 upon calling its attention by means of an interrogation signal 31, as seen in FIG. 6.

The interrogation signal 31 comprises a group of pulses generated by at least three reference stations 2*a*, 2*b* and 2*c*. Since the distances from the reference stations 2*a*, 2*b*, and 2*c* to the mobile station 1 have been determined by the TC center 4, and the time that the calling pulses 30 are generated aboard the mobile station 1 has been determined by the TC center 4, as well, it is possible to generate groups of pulses which will upon arrival appear aboard the mobile station 1 in a predetermined form as shown in FIG. 6. This pattern has a predetermined time relation with respect to the calling pulses 30 of the selected mobile station 1, so that only a single mobile station 1 will receive the interrogation signal 31. In order to generate an interrogation signal 31, it is sufficient to send a single pulse from the three reference stations 2*a*, 2*b*, and 2*c* but some redundancy is preferred to reduce the probability of false interrogation.

The interrogating groups of pulses are transmitted by the reference stations 2*a*, 2*b*, and 2*c*, with a time separation such that upon arrival at the selected mobile station 1 they provide the interrogation signal 31. The preferable form of an interrogation signal 31 is shown in FIG. 6, wherein T3 denotes the time separation between aboard generated calling pulses 30 and the interrogation signal 31. The time separation of the pulses within the interrogation signal 31 is denoted by T8.

The interrogation signal 31 exists only in the vicinity of the selected mobile station 1. In the other areas, the groups of interrogating pulses are shifted with regard to each other and with regard to the selected mobile station 1 calling pulses 30, so that they do not appear as the predetermined interrogation signal 31. The interrogation by the TC reference stations 2*a*, 2*b*, and 2*c* continues until the interrogation signal 31 is detected by the selected mobile station 1, which upon detection of such signal sends out an identification signal 32 at a time T4. When the mobile station is an aircraft, the identification signal 32 is preferably followed by the aircraft's altitude signal. The altitude signal is preferably sent on the same frequency as the identification signal 32 and with the same time separation T8. The identification 32 is received by a communication station 29 which thereafter sends a string of TC messages 33 for the selected mobile station 1. The messages 33 are sent under the control of the TC center 4 and arrive at the selected mobile station 1 at a predetermined instant of time T5 with regard to a calling pulse 30. The identification signal 32 is sent on a *rf* frequency $f3$, preferably around 100 MHz. The separation of the identification signal 32 pulses, is preferably about 1 $\mu$sec.

The TC messages 33 are transmitted at a microwave frequency $f_4$ which is preferably in the L band. The width T9 of the pulses within the messages 33 is preferably in tenths of a microsecond to provide optimal time multiplexing. This type of a narrow pulse requires a synchronization means, whereby the first signal within the TC messages 33 is the synchronization signal 34 which is preferably of the Barker code type.

The next signal within TC messages 33 is the signal 35 which indicates the type of the information to follow, e.g., mandatory TC requests, enroute data, approach data, communication or acknowledgement signal. The signal 35 also specifies the *rf* frequency on which such data will be transmitted and the time of the transmissions.

The mandatory requests from the TC center 4 include requested altitude, requested direction and requested speed. These requests are issued primarily to avoid collision. The requested direction is issued to all types of mobile stations while requested altitude is provided only for flying mobile stations. The requested speed is issued only for land and marine mobile stations.

The enroute data includes cross-track error, along-track error, distance "to go" and position in latitude-longitude coordinates. The main purpose of this data is to provide the pilot with navigational data which can be used for manual navigation of the mobile station at the convenience of the pilot or for automatic enroute mobile station guidance by means of cross-track error and along-track error. In the event the navigational data is to be employed for automatic enroute mobile station guidance, then the cross-track error and along-track error are fed from latch 26 into autopilot 69 (FIG. 9), as will be discussed more fully hereinafter.

The approach data comprises two separate groups of pulses. The first group indicates the horizontal deviation and is transmitted to all types of mobile stations. The second group of pulses indicates vertical deviation for flying mobile stations and distance "to go" for land and marine mobile stations. The approach data for a flying mobile station is provided by a system of the type disclosed in U. S. Pat. No. 3,392,390 or a similar type system. This data is fed as an input to TC center 4 which transmits it to the mobile station. It is preferable, however, that such information be transmitted via a transmitter disposed within the vicinity of the airport.

The mobile station 1, in addition to the capability of navigational data transmission, preferably has provisions for voice communication with the TC center 4. Whenever the TC center 4 intends to communicate with the mobile station 1, there is transmitted within the signal 35 information about voice communication channel and the time of such transmission. Voice communication from the mobile station 1 to TC center 4 is initiated by means of a signal 37 which indicates to the TC center 4 a request for voice communication. Upon reception of a signal 37, the TC center 4 assigns a communication channel and the time of the transmission from the mobile station. Upon the TC center obtaining the attention of the mobile station 1 by means of interrogation signal 31 and receiving therefrom the identification signal 32, the necessary information is relayed to the mobile station 1 via the signal 35.

Figure 12:
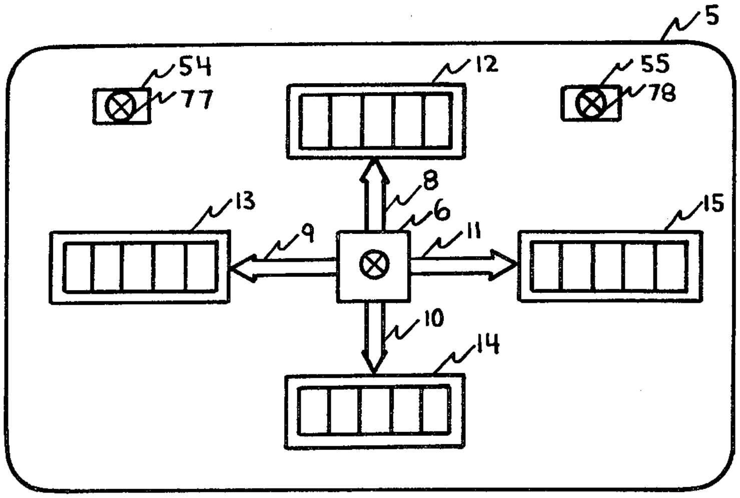
FIG. 12 depicts a preferred embodiment of a display positioned aboard a flying mobile station.

The TC data and pulse code modulation (PCM) data (voice communication) are transmitted at a time T10 by means of a signal 36 which is transmitted on the rf frequency channel specified by the signal 35. The TC data is preferably in binary coded decimal (BCD) form, so that upon detection aboard the selected mobile station 1 it is displayed directly on a display 5 (FIG. 12) without necessitating any additional conversion. This lowers the price of onboard equipment and enhances its reliability. Because of the BCD form of the entire TC date within signal 36, the basic TC data unit is composed of 4 bits and each TC data is expressed by a multiplicity of such four-bit units.

The error in information decoding aboard the mobile station 1 is eliminated by retransmitting back to the TC center 4 the received and decoded TC requests, enroute data and approach data. The retransmission back to TC center 4 is accomplished by means of a signal 41. The signal 41 is transmitted at a time T13 on an rf frequency $f_6$ which is preferably in the L band and which is received by the communication station 29. If the signal 41 is the expected one, the communication station sends an acknowledgement to the mobile station 1 via the signal 35. In order to prevent reception of the signal 35 by other mobile stations within a given area, the signal 35 is preceded by the interrogation signal 31 which is received only aboard the selected mobile station 1.

Since the instant of time of all communications between the mobile stations and the TC centers is determined by the TC centers, a multiplicity of communications is accomplished in one common rf channel (time division multiplex communication). There are no problems encountered with TC data as they are all sent in one group within the signal 36. However, the voice communication requires about 8,000 samples per second. In order to provide each mobile station with this number of samples would require sophisticated computations at the TC centers. The problem is greatly simplified if the voice samples are sent in groups, whereby the number of transmissions will be about 50 times smaller. There are preferably 64 voice samples within each group and since there are preferably 8,000 voice samples per second, there are 125 groups of voice samples per second. To increase the reliability of communications, each group is preferably preceded by a synchronization signal of the same type as signal 34.

In some applications it may be desirable to dispense with the procedure of retransmission back to the TC center 4. This may be accomplished by providing the TC data using self-correcting codes. However, more sophisticated equipment onboard the aircraft is required which equipment provides self-checking codes. These types of codes are discussed in Low-Density Parity-Check Codes by Robert G. Gallager, published by the MIT Press in 1963 and in Digital Communications With Space Applications by Golomb et al., published by Prentice-Hall, Inc. in 1964.

It is also to be noted that although not necessary, it is preferable, instead of transmitting new coordinates or any other type of data, to transmit changes in data from the values previously sent. This method of data transmission requires less time to transmit new TC data.

Since the TC center 4 monitors the traffic in a manner such that the exact position of each mobile station in the area is known, the TC center 4 may also provide services for telephone companies and this is illustrated in FIG. 14. A user 70 dials the particular telephone number N assigned to a mobile station 76. The telephone center 71 receives the dialed mobile station number N and the telephone number M of the user 70. Thereafter the center 71 relays this information to the nearest TC center 4 which upon reception of the selected number N, searches for the mobile station 76 in its area. If the selected mobile station 76 is not in the area of the TC center 4, it relays the selected number N and the telephone number M of the user 70 to all other TC centers. When a TC center such as center 72 finds the mobile station 76 in its area, it interrogates the mobile station 76 by means of signal 31. When the center 72 receives the identification signal code 32 of the mobile station 76, it provides athe mobile station 76 with voice communication in the manner described hereinbefore. The signal transmission between TC center 72 and mobile station 76 is via the communication station 75 which is similar to the station 29 described previously. The voice communication between the user 70 and the mobile station 76 is relayed via a telephone center 73, which is that telephone center nearest to the TC center 72.

The information exchange between computer centers of two adjacent areas is fully automatic and when the mobile station 76 departs one and enters another area traffic control zone there is no requirement for any manual switching at TC center 72 or aboard the mobile station 76. The task of monitoring and guiding the mobile station 76 is automatically transferred to the other TC center.

The foregoing system operation is accomplished by means of the circuitry described hereinafter.

Figure 7:
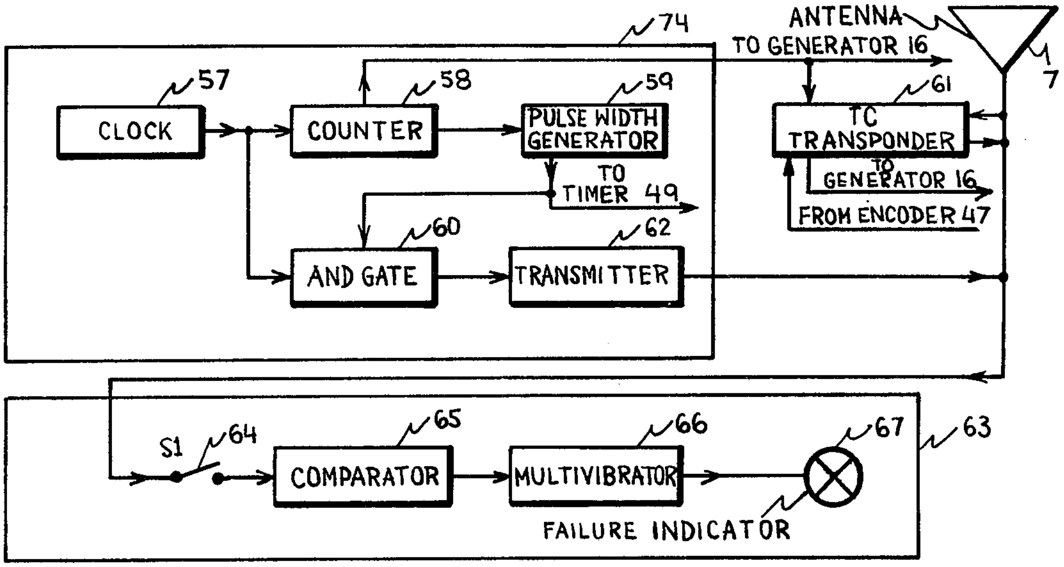
FIG. 7 is a block diagram illustrating a calling pulse generator and a traffic control transponder disposed aboard a flying mobile station.

The calling pulses 30 are generated by a pulse generating means 74 shown in FIG. 7 which includes a clock 57 whose output pulses are fed to and counted by a counter 58. The overflow of the counter 58 occurs at the end of the time period T1 which is preferably 40 milliseconds. The counter overflow triggers a pulse width generator 59, producing a pulse of predetermined width T2, preferably about 1 microsecond, which pulse gates the carrier frequency provided by the clock 57. The transmitter 62 processes the output of the AND gate 60 to provide a proper power spectrum of the signal which is fed to the antenna 7.

The operation of the calling pulse generator 74 is monitored continuously by a system check means 63. Each calling pulse fed to the antenna 7 switches the state of a comparator 65. This in turn triggers a multivibrator 66, producing a pulse whose width is preferably 90 percent of the period between successive calling pulses 30. Whenever the multivibrator 66 is in its low state, it causes a failure indicator 67 to light at a nominal current. The high state of the multi-vibrator 66 fully blanks the failure indicator 67. Thus, whenever the comparator 65 senses the proper signal being fed to the antenna 7, the multivibrator 66 is in its high state 90 percent of the time and the failure indicator 67 glimmers to indicate proper operation of the calling pulse generator 74 and the system check means 63. When a weak signal is fed to the antenna 7, the output of comparator 65 remains unchanged and the multivibrator 66 stays in its low state all the time, causing the failure indicator 67 to light fully. Under unfavorable lighting conditions, the glimmer of the failure indicator 67 can be doubtful and to check the operation of the system check means 63 the switch 64 is placed in its open position. This causes the failure indicator 67 to light fully whenever the system check means 63 is operating properly.

Figure 8:
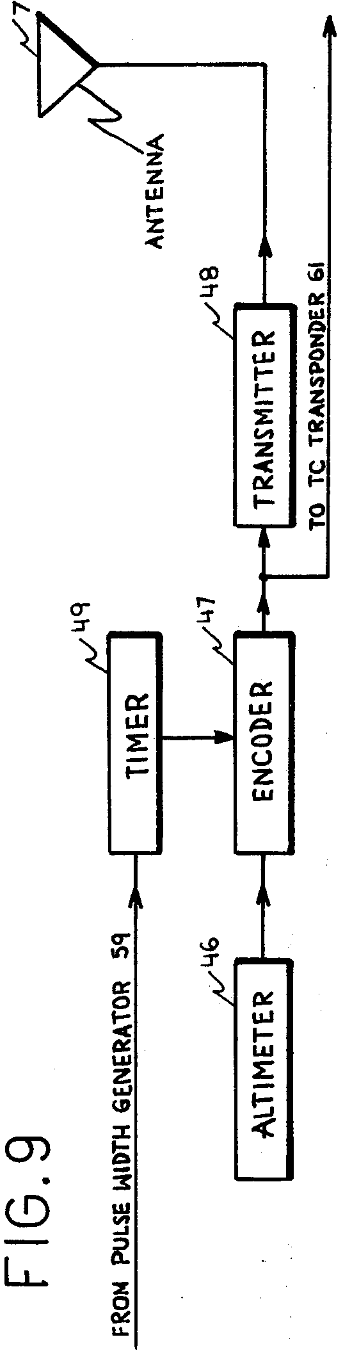
FIG. 8 is a block diagram of an altitude encoder aboard a flying mobile station.

As discussed previously, each flying mobile station transmits its altitude in a coded pulse form 68 on the altitude channel $f_2$, preferably around 100 MHz. As shown in FIG. 1, the altitude coding pulses are in a predetermined time relation T11 with the calling pulses 30. The coded pulses 68 are produced by means of an altitude encoding system, such as that illustrated in FIG. 8.

Each flying mobile station within the system transmits its altitude by means of an altimeter 46, encoder 47, timer 49 and transmitter 48. The encoder 47 encodes the output of altimeter 46 into a digital form which provides coded information that indicates altitude in increments of 250 feet. The output of encoder 47 is fed to a transmitter 48 under the control of a timer 49. The timer 49 is triggered by the pulse width generator 59 (FIG. 7), therefore the altitude data emanating from the antenna 7 is in predetermined time relationship with the aboard generated calling pulses 30. The timer 49 provides the altitude information pulses 68 at a time separation T12 which is preferably about 5 seconds.

After the calling pulses 30 are generated, the TC transponder 61 awaits the interrogation signal 31. Since this signal arrives at a predetermined time with regard to aboard generated calling pulses 30, the TC transponder 61 is enabled only for a limited period of time. Upon receiving the interrogation signal 31, the TC transponder 61 produces its specific code, assigned to a given mobile station. The TC transponder 61 is similar to the ATC transponders presently in use and, in particular, to 105B type transponder manufactured by Aircraft Radio Corporation of Boonton, New Jersey. However, due to the high selectivity of the interrogation signal 31, the TC transponder 61 does not have, nor does it require, circuitry to produce an extra pulse in the event two aircrafts are on the same code. The transponder 61 has receiving and decoding means as well as transmitting and coding means. The coder within transponder 61 does not require provisions for modifying the mobile station code. The receiver-transmitter preferably operates on a signal frequency in the 100 MHz region, as opposed to the 1,000 MHz region used in presently existent transponders.

As discussed above, since the transponder 61 is provided with receiving and decoding means, coded pulses may be transmitted to the transponder, which if connected to a display, may have the information carried by the pulses directly displayed to provide a visible collision warning output which will advise a pilot to turn either right or left. to climb or descend.

The identification signal 32 generated by the TC transponder 61 is received by the communication station 29 which upon reception thereof transmits the signal 33 under the control of the TC center 4.

Figure 9:
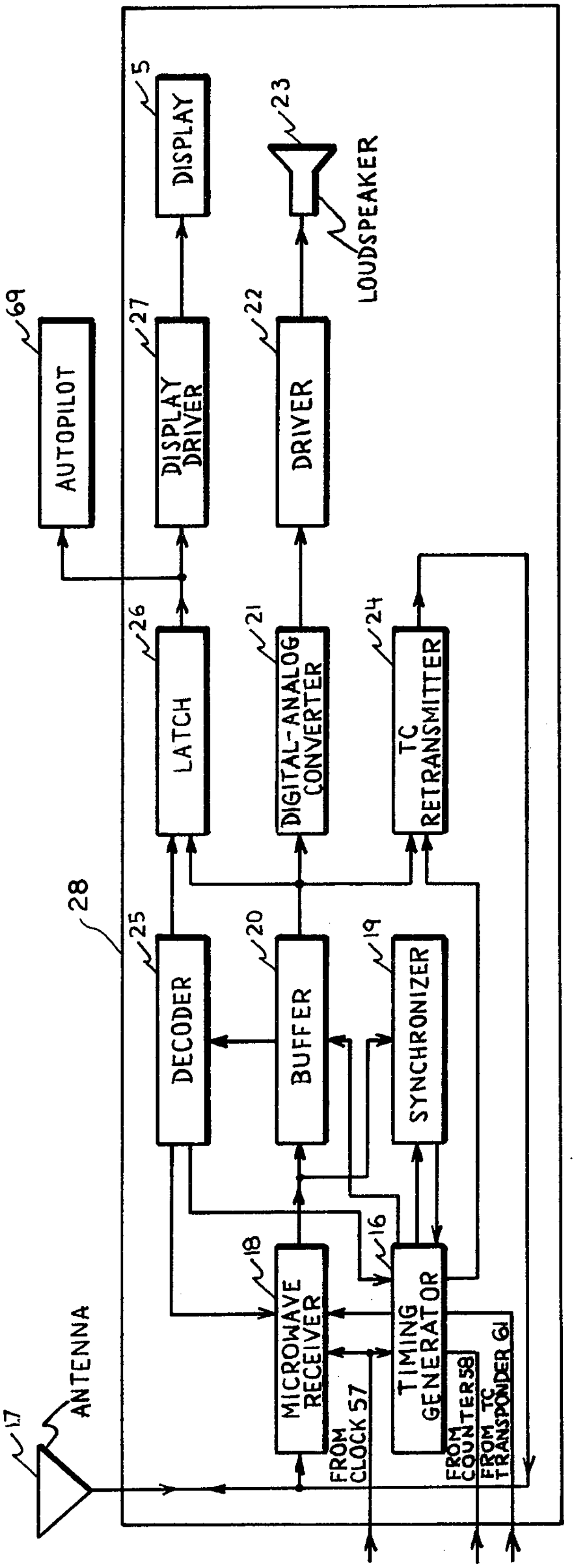
FIG. 9 is a block diagram of the communication receiver disposed aboard a flying mobile station.

The TC messages 33 are received aboard the mobile station 1 by a communication receiver 28, shown in FIG. 9. When the TC transponder 61 is activated by the signal 32, it enables or activates a timing generator 16. The timing generator 16 is triggered by the overflow of counter 58 so that the synchronizer 19, monitors only a predetermined interval of time within which a synchronization signal 34 should arrive. The signal 34 is received by a microwave antenna 17 and processed by a microwave receiver 18. The signal 34 is detected by the synchronizer 19 which synchronizes the outputs of the timing generator 16. The synchronized output of the timing generator 16 is used within the receiver 18 for information bits detection and within the buffer 20 for addressing the information bits. As discussed previously, the first signal following the synchronization signal 34 is the signal 35 which indicates designation of the information to follow. This signal is stored within the buffer 20 as are all bits of the signal 36 which carries the actual information from the TC center 4. A decoder 25 decodes the signal 35 stored within the buffer 20 and presets the timing generator 16 in a manner such that upon receiving the last message within the signal 36, the timing generator 16 initiates a retransmission of the received signal 36 back to the communication station 29. Preferably, only the voice communication and an acknowledgement signal are not retransmitted. The retransmission is accomplished by a TC retransmitter 24 which is under control of the timing generator 16 to provide predetermined time outputs with regard to aboard generated calling pulses 30. The communication station 29 receives the retransmission and relays it to the TC center 4. If the retransmission signal is the expected one, the TC center 4 provides an acknowledgement signal, which is sent within a new signal 35. Upon reception of the acknowledgement signal, the decoder 25 enables a latch 26 which stores the information within the buffer 20. The latch 26 provides an input to a display driver 27 which, in turn, drives the numerical displays within the display 5, depicted in FIG. 12. The output of latch 26 is also fed to the autopilot 69. Since the latch 26 contains actual guidance data, the autopilot 69 performs enroute navigation as well as approach to a destination (the landing for an aircraft). The display driver 27 provides blinking as well as a continuous light for the display 5. The logic circuitry within the driver 27 is under control of the type of information to be displayed which information is supplied by the decoder 25. The output from decoder 25 is stored within the latch 26, so that all necessary information for the display driver 27 is provided by the latch 26.

Whenever the signal 35 indicates that a voice communication folows, the decoder 25 disables loading of the latch 26 from the buffer 20, so that the display 5 displays theinformation previously stored in the latch 26. Simultaneously the decoder 25 selects the *rf* channel of the receiver 18 and presets the timing generator 16 according to values specified within the signal 35. The decoder 25 also enables a 125 millisecond clock within the timing generator 16. The clock controls the output of buffer 20 fed to the digital-analog converter 21 which converts the PCM of the voice samples into an analog signal. The analog signal, after amplification and filtering by a driver 22, drives a loudspeaker 23.

The TC center 4 derives the frequency of the clock 57 based upon tracking of the calling pulses 30. The TC center 4 relays this information to the communication station 29 which preadjusts the carrier frequency of the transmitted signals ina manner such that the received carrier frequency at the selected mobile station 1 is in syncrhonism with the output of clock 57. Since the output of clock 57 controls the matched filters within the receiver 18, the matched filters are centered on the received carrier frequency.

Figures 10, 11:
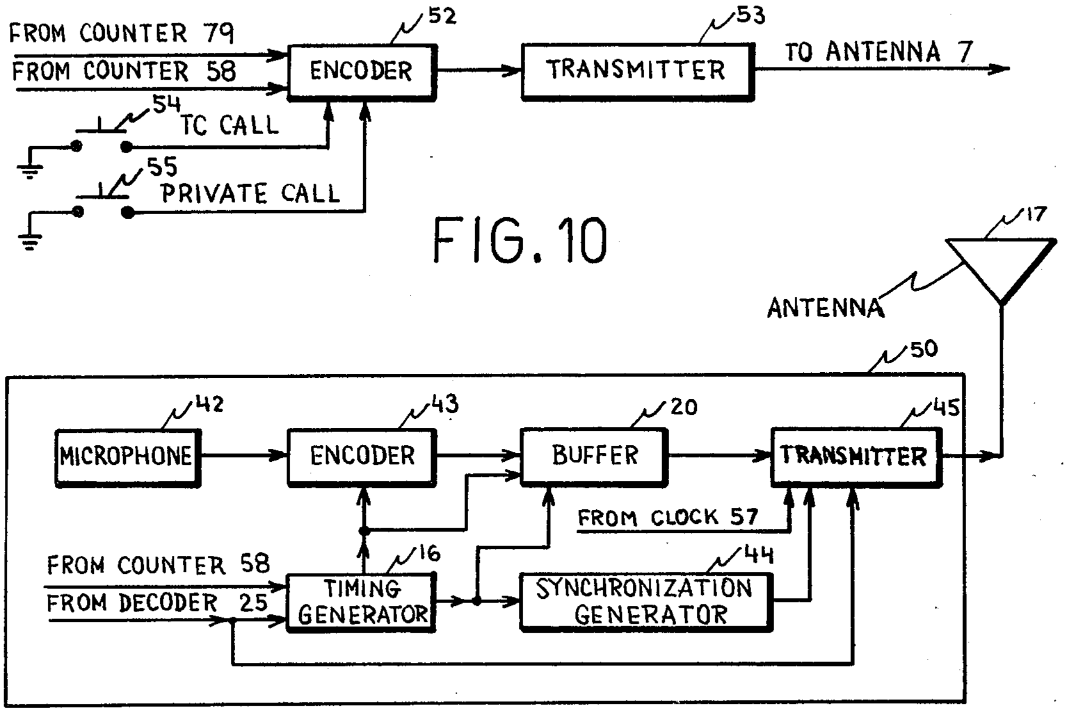
FIG. 10 illustrates an interrogator positioned within the mobile station for interrogation of the traffic control center depicted in FIG. 2.
FIG. 11 is a block diagram of a communication transmitter disposed aboard a flying mobile station.

The interrogation of the TC center 4 by the mobile station 1 is accomplished by the circuitry illustrated in FIG. 10. The output of encoder 52 is under control of the counter 58, whereby the signal output of encoder 52 is in predetermined time relationship T6 with the calling pulses 30. The output of encoder 52 carries a communication interrogation 37 signal from the mobile station and is transmitted via transmitter 53. Whenever the encoder 52 is triggered by the counter 79 (FIG. 13), the signal 37 indicates an automatic request for an interrogation by the TC center 4.

Pressing the button 54 causes the signal 37 to indicate a request for communication with the TC center 4. A private telephone call is initiated by pressing the button 55. The signal 37 which carries this information on an rf frequency *f5* is continuously generated until the first interrogation signal 30 is received by the TC center 4.

The signal 37 is actually received by the communication station 29 which then relays the information to the TC center 4. The TC center 4 assigns a communication channel and informs the mobile station 1 as to the rf channel on which the voice communication should take place. This information is sent within the signal 35, as hereinbefore described. In order to prevent reception of the voice communication by other mobile stations, signal 35 is preceded bya high selectivity interrogation signal 31 and selected mobile station identification signal 32.

Whenever the decoder 25 decodes within the signal 35, permission for a voice communication on a predetermined rf channel, it selects the rf channel of the transmitter 45 shown in FIG. 11. The decoder 25 also enables timing generator 16, which is under control of the counter 58 and provides the following outputs:

a. an 8KHz clock signal which controls the voice sampling within the encoder 43 and addressing of the voice samples within the buffer 20.

b. a communication rate clock signal which is preferably in the 10 MHz range and which controls the rate of communication signals emanating from transmitter 45, by controlling the output of buffer 20.

The voice communication transmitter 50 is shown in FIG. 11 while the transmitted signals are depicted by FIG. 6. The voice output signal of microphone 42 is encoded into 7 bit PCM within the encoder 43. The output of encoder 43 is gated into the buffer 20 under the control of the timing generator 16 whenever the decoder 25 decodes permission for a voice transmission. It is herein to be noted buffer 20 is the same buffer as used in FIG. 9 and when it receives the 64th sample, the timing generator 16 enables a synchronization generator 44 at a time T7 which is determined by the output of decoder 25. The synchronization generator 44 preferably produces a Barker code type of synchronizing signal 39. It is also to be noted that timing generator 16 serves a dual purpose, as seen from FIGS. 9 and 11.

After the transmission of the signal 39 has ended, the timing generator 16 loads voice samples from the buffer 20 into the transmitter 45, which transmits a PCM signal 40 under control of the 10 MHz output from the timing generator 16. Since the clock 57 controls the carrier frequency of both the signals 39 and 40, the carrier frequency of these signals on their arrival at communication station 29 is precomputed by the TC center 4. The TC center 4 informs the communication station 29 as to the carrier frequency of the signals 39 and 40. Communication station 29 then uses this information to adjust the matched filter for the reception of the signals 39 and 40. The control of the rf spectrum utilization lies within the TC center 4 which selects the rf channel and the instant of the transmission to and from the mobile stations. The permission for a voice communication from mobile station 1 is thus issued by TC center 4. This permission is indicated by a continuous light 77 within the display 5, shown in FIG. 12. When the voice communication is a private telephone call, the permission for voice communication is indicated by a continuous light 78. The communication transmitter 50 is only operative when light 77 or 78 is on. In all other instances, there is no voice transmission and to obtain permission for voice communication permission, it is necessary to push the button 54 for the TC communication or to push the button 55 for a private telephone call. The lights 77 and 78 are provided within the push buttons 54 and 55, respectively.

The display 5 provides the pilot with all the information necessary for collision avoidance, enroute navigation and for an approach to the destination. The collision avoidance information is displayed in the following manner: the requested direction is displayed by means of flashing red arrows 9 or 11,depending upon direction of the evasive maneuver. The associated numerical displays 13 and 15 indicate the requested heading. Blinking of the arrows 8 or 10 indicates, in the case of flying movile stations, a vertical maneuver, "up" and "down" respectively. In the case of a surface mobile station, the arrows 8 and 10 indicate "speed up" and "slow down," respectively. The associated numerical displays 12 and 14 indicate the desired new altitude for the aircraft and desired new speed for the surface mobile station.

The enroute data is displayed in the following manner: the numerical displays 13 and 15 indicate left and right cross-track error, while the displays 12 and 14 indicate positive and negative along-track error, respectively. Upon pressing the button 6, the displays 13 and 15 indicate latitude and longitude, respectively, while display 12 indicates distance "to go." This data is displayed only while pressing button 6.

The approach and landing data is displayed as follows: the horizontal correction is displayed by means of blinking arrows 9 and 11. The arrows 8 and 10 indicate "go up" and "go down" for an aircraft, while the arrow 8 warns the surface mobile station to "slow down." The numerical displays 13 and 15 indicate the magnitude of the horizontal deviation from a predetermined path. the displays 12 and 14 indicate, in the case of an aircraft, vertical deviation, while, in the case of a surface mobile station, the display 12 indicates the distanct to go. All approach (landing) data is preferably in feet.

To differentiate between collision avoidance and approach data, a green light within push-button 6 lights continuously, while the approach data is displayed.

It is within the contemplation of the present invention that the above information be displayed on displays presently in use in aircraft cockpits; however, in order to do so the digital information must first be converted into an anlog signal to be used in these displays.

Each mobile station within the system is interrogated by the TC center 4 at least once every 10 seconds . Whenever the interrogation does not take place within 10 seconds, the encoder 52 is enabled by the counter 79 to produce an input to transmitter 53. When during enroute navigation an interrogation signal 31 does not occur for 20 seconds, the pilot is alarmed by a continuous red light disposed within button 6. Upon such alarm, the pilot reports by means of radio communication to the TC center 4, which informs the pilot as to the cause of silence and in case of a malfunction aboard the mobile station will guide him by means of radio communication. Since the reliability of the system will be very high, the occurrence of such a malfunction will be very rare. Therefore, the occurrence of such a malfunction will not create overloading of the Tc controllers.

Figure 13:
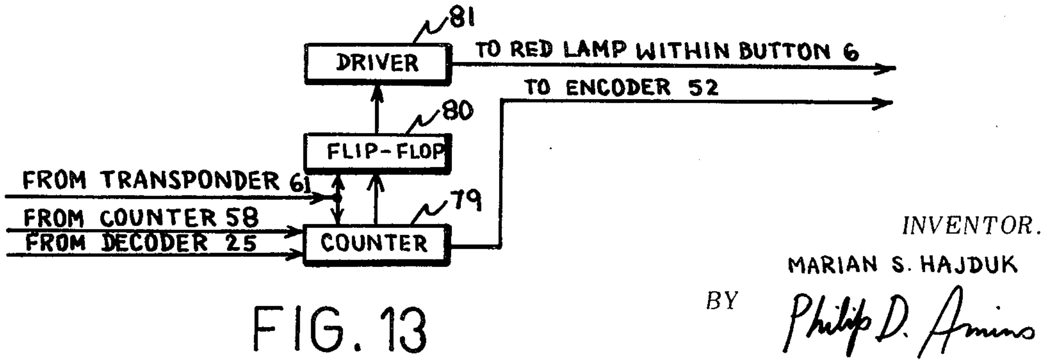
FIG. 13 is a block diagram of a traffic control interrogation monitor employed aboard a flying mobile station.

The maximum interrogation period of 20 seconds is controlled by means of counter 79, flip-flop 80 and driver 81 (FIG. 13). The counter 79 counts the overflows from counter 58 and whenevr its content reaches the equivalent of 20 seconds, the counter 79 will set the flip-flop 80 into its high state. The output of flip-flop 80 is amplified by the driver 81, which, in turn, activates the red lamp within the button 6. Each interrogation signal 31 resets the counter 79 and flip-flop 80, so that the time measurement starts anew.

During an aircraft land approach, the interrogation signal 31 is preferably received at least once each 2 seconds. In order to provide proper warning, the counter 79 is preset under the control of the decoder 25 whenever it detects the approach data by means of signal 35.

it is thus seen that I have provided a new and novel area surveillance system for the detection and communication with movile stations and, in the case of flying moblie stations (aircraft), a system for locating, communicating and guiding said aircraft. Thus, the block diagrams described described and discussed in conjunction with the present invention may be constructed from present day state of the art equipment pursuant to the criterion specified hereinabove.

The system of the present invention incorporates therein all the necessary data for the safe, manual or automatic guidance of mobile stations. The provision of time-sharing communication with mobile stations ensures the necessary capacity for handling future traffic growth. Moreover, the information exchange between mobile stations and traffic control centers is fully automatic and under the control of automatic processors which will contribute to the safety and efficiency of transportation.

while I have shown and described the preferred embodiment of my invention, it will be apparent to those skilled in the art that there are many modifications, changes and improvements which may be made therein without departing from the spirit and scope thereof.

what is claimed is:

1. An area surveillance system comprising
a traffic control center,
a plurality of reference stations in excess of two,
a mobile station, and
calling signal generation means disposed aboard said mobile station, said calling signal generation means being operable to repetitiously generate a predetermined calling signal.
each of said reference stations receiving said calling signal, and each of reference stations being connected to said traffic control center,
said traffic control center including computing means,
each of said reference stations relaying the time of arrival of said received calling signal thereat to said computing means,
said computing means being operable to track said calling signal and to compute the position of said reference stations in dependence upon the difference in the time of arrival of said calling signal at said reference stations as provided by said tracked calling signal,
said computing means after computation of the position of said mobile station being operative to produce and feed an interrogation trigger signal to selected ones of said reference stations,
said reference stations upon reception of said interrogation trigger signal being operable to transmit interrogating pulses to said mobile station which arrive thereat in an alignment so as to form a predetermined interrogation signal only in the vicinity of said mobile station as computed by said computing means,
said mobile station including means for detecting and identifying said interrogation signal, and
said means for detecting and identifying said interrogation signal being responsive to said interrogation signal to transmit an identification signal assigned to said mobile station.

2. An area surveillance system in accordance with claim 1, including
a communication station,
said communication station including means for receiving said identification signal,
means for connecting said communication station to said traffic control center, and
means for relaying said received identification signal from said communication station to said computing means.

3. An area surveillance system in accordance with claim 2, wherein
said computing means is operable upon deriving the position of said mobile station to provide guidance data for said mobile station,
said guidance data being relayed to said communication station and transmitted therefrom to said mobile station,
said mobile station including receiving means which are operable to receive said transmitted guidance data, and
output means disposed aboard and mobile station and connected to said receiving means of said mobile station for accepting said guidance data relayed thereto.

4. An area surveillance system in accordance with calim 3, wherein
said output means comprises display means for providing a visual display of said guidance data.

5. An area surveillance system in accordance with claim 3, wherein
said output means comprises operational control means,
said operational control means being responsive upon receiving said guidance data to control the direction of movement of said mobile station.

6. An area surveillance system in accordance with claim 5, wherein
said output means also comprises display means for providing a visual display of said guidance data.

7. An area surveillance system in accordance with claim 3, wherein
said computing means provides said guidance data in predetermined time relationship with said calling signal.

8. An area surveillance system in accordance with claim 3, wherein
said receiving means includes means for retransmitting said received guidance data to said communication station and thereby to said traffic control center for verification of said received guidance data 9. An area surveillance system in accordance with claim 3, wherein
said traffic control center transmits voice communications to said mobile station, and receives voice communications from said mobile station, said mobile station receiving means being operable to receive said voice communications from said traffic control center,
and with the addition of means for reproducing said received voice communications connected to said mobile station receiving means, and
voice communication transmitting means disposed aboard said mobile station.

10. An area surveillance system in accordance with claim 9, including means disposed aboard said mobile station for requesting permission of said traffic control center to engage in voice communication therewith.

11. An area surveillance system in accordance with claim 10, wherein
said voice communication transmitting means includes means to prevent transmission therefrom until permission therefor is transmitted by said traffic control center.

12. An area surveillance system in accordance with claim 9, wherein said voice communication transmitting means at said traffic control center and aboard said mobile station are operable to transmit pulse samples of the voice communications which are to be transmitted.

13. An area surveillance system in accordance with claim 12, wherein said voice pulse samples are transmitted in groups within predetermined periods of time.

14. an area surveillance system in accordance with claim 13, wherein said guidance data and said voice communication are transmitted in predetermined time relationship with one another.

15. An area surveillance system in accordance with claim 14, wherein said guidance data and said voice communications are transmitted on a common frequency channel by means of time multiplex communication.

16. An area surveillance system in accordance with claim 9, wherein said voice communication to said mobile station from said traffic control center are relayed by said communication station, and said voice communication from said mobile station to said traffic control center are relayed by said communication station.

17. An area surveillance system in accordance with claim 16, including at least one central telephone center, and a plurality of individual telephone users connected to said central telephone center, said central telephone center being connected to said traffic control center, said traffic control center enabling said telephone users to communicate with said mobile station through said communication station, whereby said telephone users may dial a number assigned to said mobile station sand have voice communication with a selected person aboard said mobile station.

18. An area surveillance system in accordance with claim 17, including a second central telephone center, means for connecting said second telephone center to said first telephone center, a second traffic control center located remotely of said first traffic control center, a second communication station connected to said second traffic control center, and means for connecting said second telephone center to said second communication station.

19. An area surveillance system in accordance with claim 18, including means for connecting said first traffic control center to said second traffic control center.

20. An area surveillance system in accordance with claim 17, including a second traffic control center located remotely of said first traffic control center, a second communication station connected to said second traffic control center, and means for connecting said first traffic control center to said second traffic control center, whereby said telephone users may dial a number assigned to said mobile station and be connected to said first traffic control center and have voice communication with said mobile station via said second traffic control center said second communication station.

21. An area surveillance system in accordance with claim 9, including at least one central telephone center, a plurality of individual telephone users connected to said central telephone center, means for connecting said central telephone center to said traffic control center, and means at said traffic control center to enable said individual telephone users to communicate with said mobile station, whereby said telephone users may dial a number assigned to said mobile station and have voice communication with a selected person aboard said mobile station.

22. An area surveillance system in accordance with claim 3, including means connecting said calling signal generation to said mobile station receiving means, said mobile station receiving means including means for correlating the rf frequency of said receiving means with the frequency of said calling signal, said computing means being operable to track said calling signal and to compute the frequency of said calling signal as would be received by said commuication station, said communication station including transmitting means, said computing means being operable to correlate the carrier frequency of said communication station transmitting means with that of the frequency of said calling signal as would be received by said communication station, and said correlated carrier frequency of said communication station transmitting means being in synchronization with said rf frequency of said mobile station receiving means.

23. An area surveillance system in accordance with claim 3, wherein said communication station and one of said reference s tations are positioned at the same geographical location.

24. An area surveillance system in accordance with claim 23, including means connecting said calling signal generation means to said mobile station receiving means said mobile station receiving means including means for correlating the rf frequency of said receiving means with the frequency of said calling signal, said computing means being operable to track said calling signal and to compute the frequency of said calling signal as received at the communication station location, said communication station including transmitting means, said computing means being operable to correlate the carrier frequency of said communication station transmitting means with that of the frequency of said calling signal as received at said communication station location, and said correlated carrier frequency of said communication station transmitting means being in synchronization with said rf frequency of said mobile station receiving means.

25. An area surveillance system in accordance with claim 3, wherein one of said reference station is said communication station.

26. An area surveillance system in accordance with claim 25, including means connecting said calling signal generation means to said mobile station receiving means, said mobile station receiving means including means for correlating the rf frequency of said receiving means with the frequency of said calling signal, said computing means being operable to track said calling signal and to compute the frequency of said calling signal as received at the communication station location, said communication station including transmitting means, said computing means being operable to correlate the carrier frequency of said communication station transmitting means with that of the frequency of said calling signal as received at said communication station location, and said correlated carrier frequency of said communication station transmitting means being in synchronization with said rf frequency of said mobile station receiving means.

27. An area surveillance system in accordance with claim 2, wherein said mobile station includes receiving means disposed thereaboard, said traffic control center transmits voice communications to said mobile station and receives voice communications from said mobile station, and said mobile station receiving means receives said voice communications from said traffic control center, and with the addition of means for reproducing said received voice communications connected to said mobile station receiving means, and voice communication transmitting means disposed aboard said mobile station.

28. An area surveillance system in accordance with claim 27, including means disposed aboard said mobile station for requesting permission of said traffic control center to engage in voice communication therewith.

29. An area surveillance system in accordance with claim 28, wherein said voice communication transmitting means includes means to prevent transmission therefrom until permission therefor is transmitted by said traffic control center.

30. An area surveillance system in accordance with claim 27, wherein said voice communication transmitting means at said traffic control center and aboard said mobile station are operable to transmit pulse samples of the voice communication which are to be transmitted.

31. An area surveillance system in accordance with claim 30, wherein said voice pulse samples are transmitted in groups within predetermined periods of time.

32. An area surveillance system in accordance with claim 31, wherein said voice communications are transmitted in predetermined time relationship with one another.

33. An area surveillance system in accordance with claim 32, wherein said voice communications are transmitted on a common frequency channel by means of time multiplex communication.

34. An area surveillance system in accordance with claim 27, including means connecting said calling signal generation means to said mobile station receiving means, said mobile station receiving means including means for correlating the rf frequency of said receiving means with the frequency of said calling signal, said computing means being operable to track said calling signal and to compute the frequency of said calling signal as would be received by said communication station, said communication station including transmitting means, said computing means being operable to correlate the carrier frequency of said communication station transmitting means with that of the frequency of said calling signal as would be received by said communication station, and said correlated carrier frequency of said communication station transmitting means being in synchronization with said rf frequency of said mobile station receiving means.

35. An area surveillance system in accordance with claim 27, wherein said communication station and one of said reference stations are positioned at the same geographical location.

36. An area surveillance system in accordance with claim 35, including means connecting said calling signal generation means to said mobile station receiving means, said mobile station receiving means including means for correlating the rf frequency of said receiving means with the frequency of said calling signal, said computing means being operable to track said calling signal and to compute the frequency of said calling signal as received at the communication station location, said communication station including transmitting means, said computing means being operable to correlate the carrier frequency of said communication station transmitting means with that of the frequency of said calling signal as received at said communication station location, and said correlated carrier frequency of said communication station transmitting means being in synchronization with said rf frequency of said mobile station receiving means.

37. An area surveillance system in accordance with claim 27, wherein one of said reference stations is said communication station.

38. An area surveillance system in accordance with claim 37, including means connecting said calling signal generation means to said mobile station receiving means, said mobile station receiving means including means for correlating the rf frequency of said receiving means with the frequency of said calling signal, said computing means being operable to track said calling signal and to compute the frequency of said calling signal as received at the communication station location, said communication station including transmitting means, said computing means being operable to correlate the carrier frequency of said communication station transmitting means with that of the frequency of said calling signal as received at said communication station location, and said correlated carrier frequency of said communication station transmitting means being in synchronization with said rf frequency of said mobile station receiving means.

39. An area surveillance system in accordance with claim 1, wherein said mobile station includes timing means disposed thereaboard, means for connecting said timing means to the calling signal generation means, and said calling signal generation means producing pulses having a carrier frequency and a pulse repitition rate which is controlled by the output of said timing means.

40. An area surveillance system in accordance with claim 1, wherein said mobile station is a flying mobile station including altitude encoding means disposed thereaboard, and said altitude encoding means being connected to said calling signal generation means and being operable to produce pulses representative of the altitude of said flying mobile station in predetermined time relationship with regard to said generated calling pulses.

41. An area surveillance system in accordance with claim 1, wherein said mobile station is a flying mobile station including altitude encoding means disposed thereaboard, and said altitude encoding means being connected to said identification signal transmission means and being operable to produce encoded altitude pulses representative of the altitude of said flying mobile station in predetermined time relationship with regard to said identification signal transmission.

42. An area surveillance system in accordance with claim 41, wherein said altitude encoding means being connected to said calling pulse generation means and being operable to produce pulses representative of the altitude of said flying mobile station in predetermined time relationship with regard to said generated calling pulses.

43. An area surveillance system in accordance with claim 1, wherein said computer means comprises a computer, a plurality of computer terminals, a plurality of computer interfaces, and a central timing unit.

44. An area surveillance system in accordance with claim 43, wherein said computer is a general purpose digital computer.

45. An area surveillance system in accordance with claim 43, wherein said computer interface comprises means for differentiating said calling pulses received by said computer means, means for time correlating said differentiated calling pulses with said tracked calling pulses, and means for feeding the differential correlation information to said computer to enable the same to properly track said calling pulses.

46. An area surveillance system in accordance with claim 45, wherein said reference stations are selectively connected to said computer interfaces.

47. An area surveillance system in accordance with claim 43, wherein said computer interface includes means for causing said computer to discontinue tracking of said calling pulses when the magnitude of the received calling pulses is below a predetermined magnitude.

48. An area surveillance system in accordance with claim 47, wherein said tracking discontinuance means is operative when the magnitude of said received calling pulses is below a predetermined magnitude over a predetermined period of time.

49. The method of surveillance of the traffic flow of mobile stations from a traffic control center comprising the steps of:

a. generating calling signals on the mobile stations with the calling signals having a plurality of pulses with a common carrier frequency, with the same repetition rate, and of substantially the same shape, b. providing computing means at the traffic control center connected to at least three spaced apart reference stations, c. receiving the calling signals from the mobile stations at the reference stations, d. relaying the time of arrival of each received calling signal from the reference stations to the computing means, e. computing the position of each mobile station with the computing means for using the differences in times of arrival of each calling signal at the reference stations, f. generating and interrogation trigger signal with the computing means and feeding the interrogation trigger signal to selected reference stations, g. transmitting interrogation pulses from the selected reference stations according to the receptions of the interrogation trigger signal so that the interrogation pulses arrive in alignment in the computed position of each mobile station to form a predetermined interrogation signal for each mobile station only in the vicinity of each mobile station, h. detecting and identifying interrogation signals on each mobile station, and i. transmitting and identification signal assigned to each mobile station from each mobile station in response to the detection and identification of an interrogation signal on each mobile station.

50. The method according to claim 49 wherein, in step (f), the interrogation trigger signal is fed to selected reference stations in a predetermined time relationship with regard to the calling pulses generated on each mobile station.

* * * * *